United States Patent [19]

Mifsud

[11] Patent Number: 5,405,450

[45] Date of Patent: Apr. 11, 1995

[54] METHOD AND APPARATUS FOR REMOVING DUST FROM SURFACES PRIOR TO PAINTING

[75] Inventor: Walter J. Mifsud, W. Bloomfield, Mich.

[73] Assignee: Hose Specialties/Capri, Inc., Highland Park, Mich.

[21] Appl. No.: 156,102

[22] Filed: Nov. 22, 1993

[51] Int. Cl.$^6$ .................................................. B60S 3/06
[52] U.S. Cl. ................................. 134/1; 15/1.51; 15/308; 15/312.1; 15/319; 134/21
[58] Field of Search .................. 15/1.51, 312.1, 319, 15/308; 134/1, 21

[56] References Cited

U.S. PATENT DOCUMENTS

| | | | |
|---|---|---|---|
| 4,689,749 | 8/1987 | Glogowski | . |
| 4,777,687 | 10/1988 | Cann et al. | 15/1.51 |
| 4,941,230 | 7/1990 | Lamore | 15/1.51 X |
| 5,257,079 | 10/1993 | Lange et al. | 15/1.51 X |
| 5,280,665 | 1/1994 | McElroy et al. | 15/319 |

*Primary Examiner*—Christopher K. Moore
*Attorney, Agent, or Firm*—Harness, Dickey & Pierce

[57] ABSTRACT

An automatic tack-off machine comprises a generally cylindrical rotary brush for lifting dust, dirt and sanding particles from the surface of a body to be painted without contacting the surface and a control system to position the brush is spaced noncontacting relation to the surfaces to be cleaned. The brush has strands of polymeric material that are radially extended and electrostatically charged by rotation with the control system operating to position the free ends of the strands in close proximity to the body. An ionizing system neutralizes the static charge in the strands to enable a vacuum system to remove the dirt particles from the brush.

22 Claims, 1 Drawing Sheet

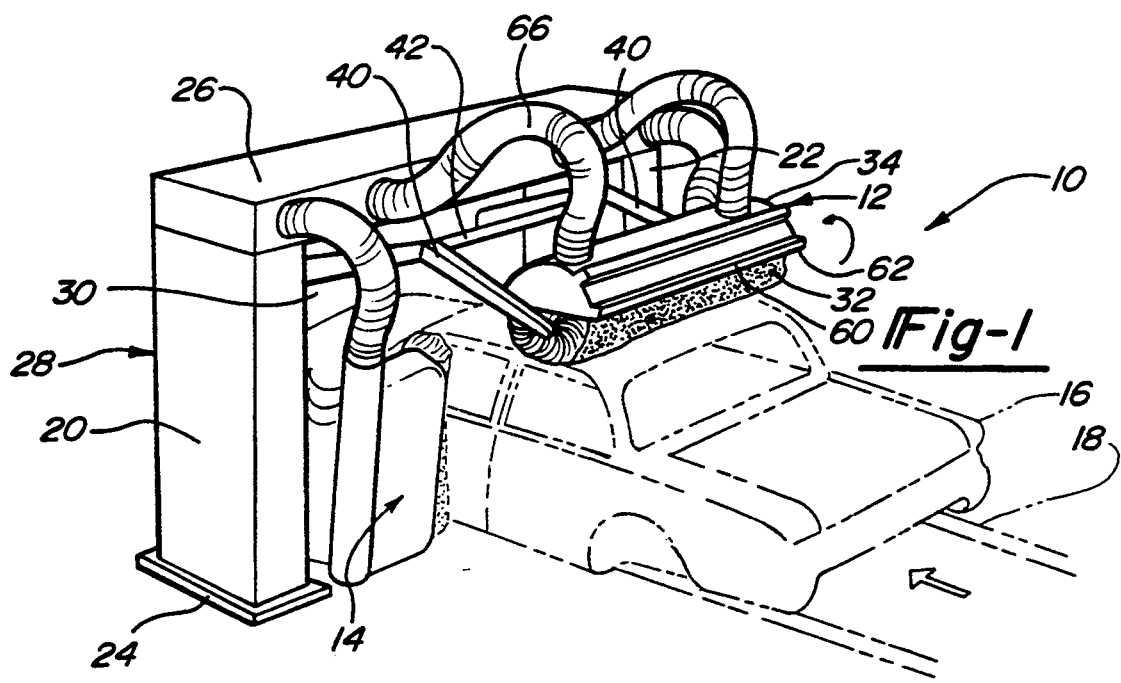
*Fig-1*
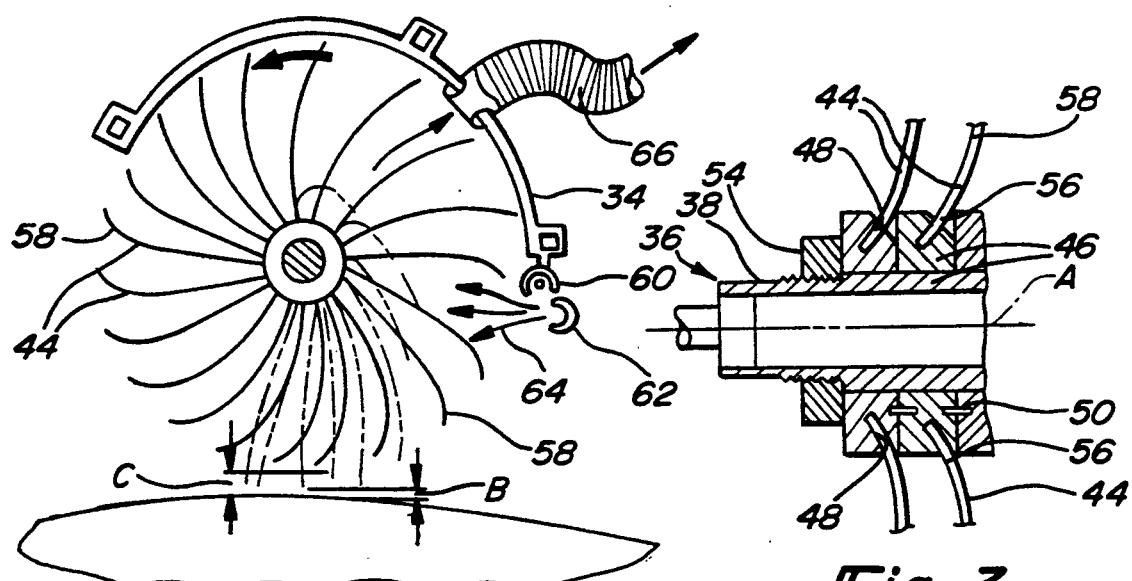
*Fig-2*     *Fig-3*
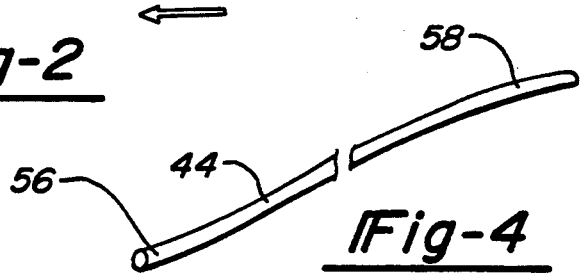
*Fig-4*

METHOD AND APPARATUS FOR REMOVING DUST FROM SURFACES PRIOR TO PAINTING

BACKGROUND OF THE INVENTION

This invention relates to tack-off machines for automatically removing dust, lint and other particulate contaminants from the surfaces of various types of articles such as a vehicle body prior to priming or painting the surfaces, and more particularly to a contactless cleaning of surfaces of vehicle bodies to prepare them for painting.

To obtain quality painting of exterior surfaces of a vehicle body, dust, lint and other particulate contaminants must be removed from the body surfaces just prior to painting these surfaces. Previously, dust, lint and other particles have been removed by machines with various brushes and manually wiping with a tacky cloth the portions of the body missed by the brushes or by manually wiping the entire body with tacky clothes. These prior approaches are costly, not uniform, and typically leave a significant amount of dust on the body.

A dust removal or tack-off machine with rotary side brushes and at least one rotary top brush which automatically follows the profile of the vehicle body as it moves past the brush to remove dust and other particulate contaminants from the front, hood, roof, and any rear deck in back of the vehicle body is shown in U.S. Pat. No. 4,689,749, the specification of which is specifically incorporated herein by reference. To ensure removal of dust from the front surfaces, the axis of the top brush moves along a path sloping generally upwardly and in the direction of travel of the vehicle body through the machine. The tack off machine senses the location of the vehicle, the style of the vehicle, and moves the elements of the brush assembly into wiping contact with the surface to be painted. Associated ionizing bars direct streams of air onto the brush to ensure that the particles of dust or other contaminants are removed by the brush.

The rotary brush is comprised of a driven tubular shaft and ostrich feathers secured in circumferentially spaced holes in hubs mounted on the tubular shaft. Although ostrich feathers are preferred, bristles of other soft and pliable material, such as synthetic resins, can be used.

While believed suitable for the purposes intended, the use of ostrich feathers has certain problems: wear, breakage of the feather during rotation, expense, and unavailability of feathers. Portions of the feather are prone to break off and may remain on the car surface and be painted over, thus requiring rework. Moreover, ostrich feathers are limited to only certain sizes which will work and thus place a limit the machine geometry. Further, there are problems associated with animal availability and care.

Tack off systems utilizing rotary brushes comprised of long polymeric strands to hit the surface to effect dust removal are known. In such systems, the degree of contact pressure of the rotary brush against the vehicle surface typically must be the same for different vehicle styles. However, during rotation and due to high rotary impact forces, the strand ends can bounce out of the path of the vehicle without properly cleaning the surface, or progressively break off, thus possibly leaving residue on the surface, each situation requiring a longer exposure of the surface vehicle surface to the cleaning brush. A prolonged exposure of the surfaces to the strands will give a "sheen" to the surface, which is objectionable to automobile manufacturers The progressive breakage of the strands is costly both in terms of the replacement cost of the brush as well as in the downtime of the paint line. Additionally, as with the ostrich feathers, broken strand portions may remain on the surface and be painted over.

An object of this invention is to provide a machine which automatically removes essentially all dust and particulate contaminants from the exterior surfaces of a vehicle surface which is to be primed or painted, eliminates contact of the body surfaces, can remove dust from a succession of vehicles and different profiles, is rugged, and of economical manufacture.

SUMMARY OF THE INVENTION

Accordingly, an apparatus is provided for automatically removing dust, lint and other particulate contaminants from the surfaces of a vehicle body prior to priming or painting. The apparatus includes an elongated shaft having an axis of rotation, a frame for supporting the shaft axis transverse to the path of travel of the vehicle bodies through the machine, an array of elongate electrostatically charged elastically flexible strands of polymeric material connected to the shaft for rotation therewith, each of the strands having a first end fixed to the shaft and a second end free to flex and move relative to the path of the vehicle and extend radially outwardly of the first end as a result of the shaft rotation, a control for controlling the position of the shaft relative to the vehicle surfaces, a sensor for sensing the vehicle surface to be cleaned relative to the rotating strands to ensure that the second ends are brought into close proximity to but spaced noncontacting engagement with the surface to be painted, and a drive for rotating the shaft.

The polymeric material, as disclosed, is uniquely capable of having enhanced ionization to develop a static charge as it rotates above the surface to be painted, effectively causing the particles to jump off the surface. In this regard, the brush is enclosed in part by a hood and electrostatically charged by rotation therewithin whereby to attract the dust, a deionization bar is positioned in the hood to neutralize the charged material, and a vacuum is associated with the hood to remove the dust, dirt and sanding particles lifted from the car body.

The tack off machine and rotary brush of the present invention has an increased resistance to breaking, minimal wear, is cheaper, and can be rapidly tailored to contoured surfaces.

These and other objects, features and advantages of the present invention will become more fully apparent from the following detailed description and appended claims, taken in conjunction with the accompanying drawings.

BRIEF DESCRIPTION OF THE DRAWINGS

FIG. 1 is a perspective view looking downwardly at a tack-off machine having a rotary brush for removing dust from a vehicle surface to be painted embodying this invention.

FIG. 2 is a side elevation view, partially fragmentary, of the vehicle and the rotary brush shown in FIG. 1;

FIG. 3 is a section view taken along line 3—3 of the rotary brush shown in FIG. 1.

FIG. 4 is an enlarged view of a strand used in the brush of FIG. 1.

DETAILED DESCRIPTION OF THE INVENTION

Referring now to the drawings, FIGS. 1-4 illustrate an exemplary embodiment of a dust removal or tack-off machine 10 of the type having one or more rotary brush assemblies for removing particulate contaminants from the exterior surfaces of an automobile vehicle prior to the surfaces being primed or painted. Although the discussion herein is in connection with cleaning the surfaces of an automobile vehicle, one skilled in the art will readily recognize that the invention is equally applicable for removing particulate matter from the surfaces of other articles, such as furniture.

Turning now to FIG. 1, the tack-off machine 10 has a top brush assembly 12 and a pair of side brush assemblies 14 for removing particulate contaminants from the exterior surfaces of a vehicle body 16 as the body is moved through the machine by a conveyor 18. The brush assemblies 12 and 14 are supported on a pair of spaced uprights 20 and 22, each having one end secured to a base 24, and a cross beam 26 fixed to the other ends of the uprights whereby to form a support frame 28 having an opening 30 through which the vehicles pass. Each of the brush assemblies 12 and 14 are similar and the discussion herein will be specifically directed to the top brush assembly.

The top brush assembly 12 comprises a rotary brush 32 adapted to remove dust from the front and back as well as the top of a vehicle body and a hood 34 disposed in part in covering relation with the brush. The rotary brush 32 comprises an axially elongated tubular shaft 36 having an axis of rotation "A" and a pair of opposite ends 38 and brush elements to remove particulate matter from the vehicle surface. To ensure that the brush assembly can remove dust from the front of the moving vehicle body, the rotary brush 32 is movable along a path inclined generally upwardly and in the direction of travel of the vehicle body at an obtuse included angle to the path of travel of the vehicle body as it approaches the brush. The shaft ends 38 are carried by a pair of pivot arms 40 fixed to a drive shaft 42 and journalled in bearings at a location vertically above the point where the rotary brush 32 is adjacent to the vehicle body.

A motor arrangement (not shown) is operatively secured to the uprights 20 and 22 and to the arms 40 whereby to pivot the arms and cause the brush 32 to follow the profile of the vehicle body 16 as it passes through the machine and also to rotatably drive the brush 32. The angular position of the drive shaft 42 and hence the position of the top brush assembly 12 is sensed and translated into an electric signal by a position sensor or encoder (not shown) coupled to the drive shaft. Preferably, the brush is rotated at a constant speed. The pivot arm drive, brush drive, motor and sensor are conventional and disclosed in the hereinabove U.S. Pat. No. 4,689,749.

According to this invention, the brush 32 comprises a plurality of axially elongate, elastically flexible strands 44 of polymeric material that are connected to the shaft 36 and adapted to rotate therewith. In the arrangement shown in FIG. 3, a plurality of annular hubs 46 are mounted to the shaft 36 and extend between the ends 38 of the shaft 36, the hubs 46 having radial holes 48 spaced around its circumference. The hubs 46 are connected together by pins 50 and to the shaft 36 by spaced apart collars 54. Each strand 44 has a first end 56 that is fixedly secured into the hole 48 of a respective hub and a second end 58 that is free to extend radially outward from its fixed end 56 upon rotation of the shaft 36.

Preferably, the strands 44 are generally uniformly arranged around the circumference of the shaft 36 in straight rows. If desired, the axial length of the strand secured by one hub could be different than the axial length of the strand secured by another hub, thus permitting the brush 32 to have a profile that matches the vehicle surface. Further, the fixed ends 56 of the strands could be disposed on equiangularly spaced rows, each row extending along a helical path between the ends of the shaft 36.

As shown in FIGS. 1 and 2, the top surface of the vehicle is moving to the left, and the brush 32 is rotating in a counterclockwise direction. The top rotary brush assembly 12 is positioned such that the free ends 58 of the strands 44 will be spaced by a predetermined amount from the surface to be cleaned, either when at rest or when being rotated by the shaft 36. The dotted lines and the vertical separation designated at "B" indicate the position of the free ends 58 of the strands 44 when the brush 32 is at rest. When the shaft 36 is undergoing rotation, the elastically flexible strands will tend to extend in a direction radially outwardly from its hub 46 but due to aerodynamic forces, the strand will assume a slightly curved shape. The free ends 58 of the strands will be separated from the vehicle surface to be cleaned by a vertical separation designated at "C".

According to this invention, each strand 44 is molded or extruded and generally uniform in cross-section, and the polymeric material is adapted to develop a static charge as it rotates through the air above the vehicle surface being cleaned. When so statically charged, the strands will tend to "lift" the particles from the vehicle surface.

In one application, the strands 44 of the present invention were comprised of organopolysiloxane compositions. Organopolysiloxane compositions suitable for use in the present invention as well as methods of making the compositions, are described in U.S. Pat. No. 4,710,559, and U.S. Pat. No. 3,810,925, both of which are herein incorporated by reference.

In particular, the organopolysiloxane compositions used in the present invention are heat curable organopolysiloxane compositions, more particularly, polydimethylpolysiloxanes. Various types of fillers may be incorporated in the organopolysiloxane compositions including reinforcing fillers (i.e., fillers having a surface area of at least 50 m$^2$/gm), and semi- or non-reinforcing fillers (i.e., fillers which have a surface area of less than 50 m$^2$/gm). Although both reinforcing and semi- or non-reinforcing fillers may be used, reinforcing fillers are preferred. Examples of reinforcing fillers include aerogels, alumins, carbon black, graphite and in particular, formed silicas or treated silicas such as, for example, silicon dioxide, which is the preferred filler of the present invention. It will be appreciated that the amount of fillers used will depend upon the desired result of the organopolysiloxane product. It is expected, however, that the organopolysiloxane compositions of the present invention will contain from about 0 to about 60% by weight fillers. In particular, the amount of filler will depend on the desired electrical properties of the strands as it has been found that filler variation contributes to the static electrical properties of the strands of the present invention.

Other additives to the organopolysiloxane compositions of the present invention may include pigments, compression set additives, oxidation inhibitors, plasticizers, base stabilizers, peroxide catalyst and other materials commonly employed in the silicone rubber art. Anti-structuring agents such as metal stannates may also be incorporated to avoid structure forming before use.

The organopolysiloxane compositions of the present invention are molded or extruded prior to polymerization. If a round product is desired, extrusion is usually used and if a square or rectangular product is desired, molding is usually used. Thus, in preparing the strands of the present invention, molding is the preferred method. After molding or extrusion, the polysiloxanes are polymerized.

In a preferred embodiment of the present invention, fillers are added to the organopolysiloxane compositions during the preparation of the compositions as well as prior to molding and extrusion of the compositions. In a most preferred embodiment, silicon fillers are employed.

To ensure removal of essentially all dust and other particles from the vehicle body, all electrostatically charged particles lifted by the strands 44 from the surface are neutralized so that they can be swept up and evacuated. Due to grounding, the vehicle body and the particles on it are usually uncharged or electrically neutral. However, movement of air over the brush 32 and rotation of the brush itself inside the hood 34 creates an electrostatic charge on the strands 44. Unless neutralized, this charge can be transferred to the particles which would inhibit the removal from the vehicle body.

To ensure electrically neutral particles, an ionizing bar 60 extends across the leading edge of the exhaust hood 34 which overlies a portion of the brush 32, and a blow tube 62 extends across the ionizing bar. The ionizing bar 60 produces both positive (+) and negative (−) charged ions. The blow tube 62 blows a stream of high velocity air, designated at 64, across the ionizing bar and the ions onto the brush 32, thereby neutralizing the electrostatically charged strands 44 when they rotate by the ionizing bar 60. If desired, the ionizing bar may include a plurality of longitudinally spaced outlets through which compressed air is discharged.

The exhaust hood 34 is connected by flexible hoses 66 to a vacuum exhaust system. The vacuum hoses 66 draw the dust and dirt from the strands 44 when the strands rotate by the hoses. Thereafter, the cleaned strands rotate back into proximity to the vehicle surface to be cleaned.

According to this invention, a control arrangement is provided to ensure that each brush assembly 12 and 14 is positioned so that the strands will not contact the vehicle surfaces. In this regard, a suitable control system is programmed with a predetermined profile for each body and the necessary path to travel of the top brush assembly 12. The control system receives a signal from a body style sensor as to the presence of each body style, and initiates movement of the top brush assembly 12 to control the positions of the brush assembly for each body style. Further, a signal from a conveyor speed sensor is sent to the control system to synchronize the movement of the top brush assembly with the speed at which the conveyor moves the body through the machine. The control system and sensors used in the arrangement are conventional and shown in the hereinabove U.S. Pat. No. 4,689,749.

While the above description constitutes the preferred embodiment of the invention, it will be appreciated that the invention is susceptible to modification, variation, and change without departing from the proper scope or fair meaning of the accompanying claims.

What is claimed is:

1. A tack-off machine for removing contaminant particles such as dust from the surfaces of a series of vehicle bodies of different styles moved along a path of travel through the machine by a conveyor means, said machine comprising a shaft having an axis of rotation, support means for supporting the shaft axis transverse to the path of travel of the vehicle bodies through the machine, a plurality of elongate elastically flexible strands connected to said shaft for rotation therewith and movement relative to the path of the vehicle, each of said strands having a first end attached to the shaft and a second end free to flex and extend radially outwardly of the first end as a result of the shaft rotation, said strands being comprised of a polymeric material adapted to become electrostatically charged upon rotation of the strands through the air, and control means for controlling the position of said shaft relative to said vehicle bodies, said control means including sensor means for sensing the position of the vehicle surface to be cleaned relative to said shaft such that the free ends of said strands are continuously brought into close proximity to but noncontacting engagement with the surface to be painted.

2. The tack-off machine as claimed in claim 1 wherein said strands consist of a heat curable organopolysiloxane composition.

3. The tack-off machine as claimed in claim 2 wherein said organopolysiloxane composition consists of about 60% by weight of a silicon dioxide filler.

4. The tack-off machine as claimed in claim 2 wherein said strands are comprised of a polydimethylpolysiloxane composition.

5. The tack-off machine as claimed in claim 2 further comprising neutralizing means at a first predetermined position of shaft rotation for neutralizing the static charge in said strands to enable the particles to be released from the strands.

6. The tack-off machine as claimed in claim 5 wherein the free ends of said strands form a generally cylindrical rotary brush when the strands are rotated, and further comprising a hood connected to said frame and enclosing at least in part the rotary brush, and vacuum means at a second predetermined position of shaft rotation for evacuating the particles attracted to the strands of said brush.

7. The tack-off machine as claimed in claim 1 wherein said support means comprises a frame, and a pair of pivot arms to support the axis of said shaft generally horizontally above the path of the vehicles, each said pivot arm having a first end pivotably connected to the frame and a second end connected to the shaft.

8. The tack-off machine as claimed in claim 7 further comprising mounting means for removably connecting said strands to said shaft, and wherein said mounting means comprises a plurality of hub members nonrotatably mounted to said shaft for rotation therewith, each said hub member having the first end of at least one strand connected thereto.

9. The tack-off machine as claimed in claim 1 wherein said strands are generally uniformly disposed in straight rows spaced angularly.

10. The tack-off machine as claimed in claim 1 further comprising drive means operatively associated with said control means for rotatably driving said shaft.

11. The tack-off machine as claimed in claim 10 wherein said drive means includes means for rotating said shaft at a constant speed.

12. An apparatus for automatically removing dust, lint and other particulate contaminants from the surfaces of a body prior to priming or painting, comprising
a frame member having an opening to receive said body, said frame including conveyor means for moving the body in a first horizontal direction through said opening,
a horizontal cleaning brush rotatable about a horizontal axis of rotation disposed in said frame member and transverse to the path of travel of the bodies through the machine, said brush including a plurality of elongate elastically flexible strands of polymeric material which become electrostatically charged upon rotation, each said strand having a first end fixed and a second end free to move radially outwardly of the first end as a result of the brush rotation,
motor means for rotating said brush at a constant speed, and
control means, including a sensor, for sensing the approach of a body to be cleaned and positioning said brush relative to the surface of said body such that the free ends of the rotating strands are brought into close proximity to but noncontacting engagement with the surface to be painted.

13. The apparatus as claimed in claim 12 wherein said polymeric material is a heat curable organopolysiloxane.

14. The apparatus as claimed in claim 12 wherein said polymeric material is a heat curable polydimethylpolysiloxane composition.

15. The apparatus as claimed in claim 12, further comprising a hood enclosing a portion of said brush, and a vacuum connected to the hood to remove the dust, dirt and sanding particles lifted by the electrostatically charged strands from the body.

16. The apparatus as claimed in claim 15 and further comprising neutralizing means for deionizing the electrostatically charged strands.

17. Apparatus for removing particulate contaminants from the surface of an article prior to the painting or priming of the surface, the apparatus comprising:
a shaft having an axis of rotation,
securing means for securing axially elongated flexible strands to said shaft such that said strands are arranged vertically due to the force of gravity, said strands being comprised of a polymeric material that becomes electrostatically charged upon one strand brushing against another strand,
drive means for rotating said shaft about its axis of rotation, said rotation causing a strand portion of each of said strands to be forced from its vertically disposed relation and thrust radially outwardly from the axis of rotation and relative to its securement to said shaft, said strands engaging one another and becoming electrostatically charged upon being thrust radially outwardly by the rotation of said shaft, and
control means, including a sensor, for sensing the location of the article and positioning the rotating strand portions in close noncontacting proximity with the article.

18. The apparatus as claimed in claim 17 wherein said strands have a first end secured to said shaft and a second end formed by its strand portion, said strand portions being free to extend radially outwardly from said shaft upon rotation of said shaft whereby to form a generally cylindrical brush.

19. The apparatus as claimed in claim 18 further comprising neutralizing means for neutralizing the electrostatic charge in said strands to enable the particulate matter to be released from said strands, and vacuum means for evacuating the particulate matter released from said strands.

20. A method for removing dust from the respective surfaces of a body prior to painting, the steps comprising
forming and mounting a plurality of elastically flexible strands of electrostatically chargeable polymeric resin on a rotatable shaft so that the strands have a first end secured to the shaft and a second end free to rotate therewith and extend radially outwardly therefrom upon rotation of the shaft,
electrostatically charging the strands by rotating the second ends of the strands, and
positioning the free ends of the strands into close proximity to but noncontacting engagement with the respective surface to be painted, whereby to lift the dust from the vehicle surface.

21. The method as claimed in claim 20 and further including the steps of
enclosing at least a portion of the brush in an elongated hood and rotating the brush therein,
neutralizing the charged strands, and
drawing the dust from the brush by evacuating the air disposed in the hood and enclosing the brush portion.

22. The method as claimed in claim 21 and further including the steps of
advancing the vehicle in a first direction, and
continuously sensing the respective surface advanced and positioning the free ends of the strands in spaced noncontacting relation thereto.

* * * * *